United States Patent [19]

Roarty

[11] Patent Number: 4,783,204
[45] Date of Patent: Nov. 8, 1988

[54] APPARATUS AND METHOD FOR DRYING STEAM

[75] Inventor: Joseph D. Roarty, Pleasant Hills, Pa.

[73] Assignee: Westinghouse Electric Corp., Pittsburgh, Pa.

[21] Appl. No.: 893,440

[22] Filed: Aug. 5, 1986

[51] Int. Cl.$^4$ ............................................. B01D 45/12
[52] U.S. Cl. .......................................... 55/18; 55/393; 55/410; 55/457; 55/348; 122/34; 73/432.1; 73/865.9
[58] Field of Search ................ 55/457, 18, 393, 347, 55/410, 348, 411, 412; 122/34, 488–491; 73/432.1, 865.9

[56] References Cited

U.S. PATENT DOCUMENTS

| | | | |
|---|---|---|---|
| 474,490 | 5/1892 | Walter | 55/412 |
| 1,215,935 | 2/1917 | Hickman | 55/393 |
| 1,383,984 | 7/1921 | Clark | 55/459 R |
| 1,896,897 | 2/1933 | Hawley | 55/455 |
| 2,393,112 | 1/1946 | Lincoln | 55/457 |
| 2,648,397 | 8/1953 | Ravese et al. | 55/457 |
| 3,597,901 | 8/1971 | Heeney | 55/241 |
| 3,788,282 | 1/1974 | Modrak et al. | 122/34 |
| 3,895,930 | 7/1975 | Campolong | 55/394 |
| 3,966,438 | 6/1976 | Nicholson | 55/238 |
| 4,008,059 | 2/1977 | Monson et al. | 55/396 |
| 4,145,195 | 3/1979 | Knappstein et al. | 55/242 |
| 4,164,398 | 8/1979 | Caesar | 55/186 |
| 4,255,174 | 3/1981 | Simpson | 55/347 |
| 4,303,043 | 12/1981 | Redding | 122/34 |
| 4,322,233 | 3/1982 | Sisk | 55/426 |

FOREIGN PATENT DOCUMENTS 39598 12/1970 Japan ........................... 55/393

Primary Examiner—Bernard Nozick

[57] ABSTRACT

Both an apparatus and a method for maximizing the separation characteristics of a swirl vane steam-drying device is disclosed herein. Generally speaking, such swirl vane separators include a housing formed from a riser barrel which is concentrically disposed within a downcomer barrel, a steam inlet at one end of the concentric barrels, a steam outlet at the other end of the concentric barrels, and a set of pitched blades disposed within the riser barrel between the steam outlet and inlet for imparting a radial component of motion to the wet steam which flows therethrough. This radial component of motion causes water droplets entrained in the steam to move in spiral paths which ultimately intersect a region in the interior of the separator which includes an opening for directing these droplets into a downcomer path defined between the concentrically disposed riser and downcomer barrels of the housing. The invention is both a blade positioner for positioning the pitched blades at an optimal point along the longitudinal axis of the housing, and a set of annular inserts which may be detachably mounted around the steam outlet of the housing for varying the diameter of the outlet. The invention is particularly adapted for use in the banks of swirl vane separators used in the secondary sides of nuclear steam generators, in that it allows each of the separators in the bank to be fine tuned in accordance with the specific characteristics of the steam flow which it receives from the bundle of heat exchange tubes which it overlies.

26 Claims, 12 Drawing Sheets

APPARATUS AND METHOD FOR DRYING STEAM

BACKGROUND OF THE INVENTION

1. Field of the Invention

This invention relates to an improved swirl vane separator for drying steam. It is particularly applicable to the swirl vane separators used in the secondary sides of nuclear steam generators.

2. Description of the Prior Art

Swirl vane separators for drying steam are well known in the prior art. In nuclear steam generators, a bank of between twelve and sixteen of such separators are frequently mounted at the upper end of the secondary side of the generator in order to remove the water droplets entrained in the steam. The removal of these droplets is important for two reasons. First, since the steam produced by such nuclear steam generators is ultimately directed against the turbine of an electric generator at pressures ranging between 900 and 1000 pounds per square inch, any residual water droplets in the steam can cause a significant amount of errosion in the blades of the turbine. Secondly, the water losses that occur as a result of such wet steam increase the amount of water that must be supplied to the steam generator, which in turn accelerates the creation of sludge deposits in the generator. Since such sludge deposits are responsible for much of the corrosion that attacks the heat exchange tubes in the steam generator, it is desirable that such water losses through the steam be reduced as much as possible.

No practical device has yet been developed which can remove all of the water droplets from such steam. However, a primary bank of swirl vane separators, in combination with an in-tandem secondary bank of vane-type separators, are capable of reducing the moisture droplet content of the steam produced by the generator to an amount equal to less than one-fourth of 1% of the total steam weight. While such a moisture droplet content does not completely prevent turbine blade erosion, it reduces the amount of erosion which occurs over time to a commercially acceptable rate. Additionally, the sludges created as a result of the associated water losses are small enough to be dealt with by known maintenance procedures.

Even though the primary and secondary banks of the water separators used in the secondary sides of nuclear steam generators have often proven equal to the task of reducing the moisture content of the resulting steam to within a commercially acceptable limit, difficulties can sometimes arise if the internal configuration of these swirl vane separators is not precisely matched to the particular characteristics of the steam which flows through the housing of the separator. But before one can appreciate the nature of these difficulties, some understanding of the structure and function of such swirl vane separators is necessary.

Swirl vane separators generally include a housing having a steam inlet at one end, a steam outlet at the other end, and a set of pitched blades mounted therebetween. The housing, in turn, is formed from a cylindrical riser barrel that is concentrically disposed within a cylindrical downcomer barrel. The outlet end of the downcomer barrel is covered by a plate-like cap. The steam outlet of the housing is formed from a round aperture that is located in the center of the cap. To minimize the pressure drop that the flow of steam experiences across the separator, the diameter of the steam outlet is frequently about three-quarters of the diameter of the cap which covers the downcomer barrel. A pitched set of stationary blades is mounted in the riser barrel for providing a radial component of motion to the water droplets in the wet steam as they flow from the inlet of the housing to the steam outlet. These blades are typically inclined to the horizontal somewhere between 30 and 37 degrees. In the interior of the housing, a downcomer opening is provided for receiving droplets of water which are flung against the sides of the riser barrel as a result of the radial component of motion imparted by the pitched blades. This downcomer opening is formed by spacing the riser barrel a short distance from the cap which overlies the outlet end of the downcomer barrel, which forms an annular gap between this cap and the upper edge of the riser barrel. The downcomer opening communicates with a downcomer flowpath that is defined in the annular space between the concentrically disposed downcomer and riser barrels.

In operation, the inlet end of the separator housing is submerged in the water boiled by the bundle of heat exchange tubes present in the secondary side of the generator. Inside the housing, the pitched set of blades is positioned at a point somewhere above the boiling water. The flow of wet steam produced by this boiling water rises, and flows through the pitched blades secured by the riser barrel of the housing. The pitch of the blades generates a radial component of motion in both the flow of steam and the water droplets entrained therein, and causes both to adopt a helical pattern of movement. However, the greater mass of the water droplets entrained in the steam causes them to have relatively wider spiral trajectories than the surrounding steam, which ultimately causes them to impinge at some point against the inner wall of the riser barrel.

If the separator has been properly tuned to match the specific characteristics of the steam which flows therethrough, a substantial amount of the droplets of water entrained in the steam will be flung into the annular downcomer opening defined in the gap between the upper edge of the riser barrel, and the inner surface of the cap which overlies the downcomer barrel. The resulting accumulation of water will then flow down the downcomer flowpath defined between the downcomer and riser barrels. By contrast, if the separator is not properly tuned to these characteristics, many of these droplets of water will either collide against the inner wall of the riser barrel, and become re-entrained, or will simply flow out of the steam outlet of the housing. In either case, the drying effectiveness of the swirl vane separator is significantly reduced under such mis-tuned conditions.

One previous method for avoiding such mis-tuned conditions involved the use of swirl vane separators having relatively small diameters (i.e., ten- vs. twenty-inch diameters) and whose internal geometry (i.e., the pitch and position of the blades) was optimized by means of a flow of freon that stimulated the average properties of the wet steam produced across the plenum of the generator. Unfortunately, this particular method has not proven to be entirely satisfactory. The utilization of a relatively larger number of smaller swirl vane separators increases the cost of the primary bank of water separators used in the secondary side of the steam generator, and mechanically complicates the structure of the steam generator as a whole. The applicant has also discovered that the freon steam flow simulation has not, in practice, resulted in optimally tuned separators for two reasons. First, the physical properties of freon are significantly different from the characteristics of water. Secondly, and more importantly, it has been found that the characteristics of the steam produced in various regions above the tube bundle of the steam generator differ substantially across the plenum. For example, the steam produced above the "hot leg" section of the secondary side has a substantially higher flow rate than the steam produced over the "cold leg" side. Hence, any approach that attempted to optimize the blade configurations of all the separators in the primary bank in accordance with a simulated "average" flow was inherently erroneous since what constituted an optimal blade configuration varied substantially for different regions above the tube bundle.

Clearly, there is a need for an individually tunable swirl vane separator whose internal geometry may be easily matched to the specific characteristics of the steam that specifically flows through the separator. Ideally, such a separator should also be easily adjustable through inexpensive mechanisms that are compatible with existing swirl vane separators. Such a separator should have a housing whose diameter is large enough so that only a moderate number of such separators are necessary for the primary bank of a steam generator in order to minimize the overall complexity and cost that the separators impose on the steam generator design.

SUMMARY OF THE INVENTION

Generally speaking, the invention is an improved swirl vane separator that fulfills all of the aforementioned criteria through the provision of an adjustment means which adjusts the shape of the spiraling paths of the water droplets entrained in the steam flow in such a way that the amount of droplets captured by the downcomer opening is maximized. The adjustment means may include a means for varying the cross-sectional area of the outlet of the separator, which in turn affects the spiral trajectory of the water droplets by changing the speed of the steam flow through the separator. The adjustment means may also include a means for varying the position of the pitched blades along the longitudinal axis of the housing of the separator, which in turn affects the point at which the spiral trajectories commence within the housing. In the preferred embodiment, the adjustment means includes both a means for varying the cross-sectional area of the steam outlet and a means for varying the longitudinal position of the pitched blades within the housing. The provision of one or both of the features of the adjustment means allows the improved swirl vane separator to be tuned in accordance with the specific properties of the flow of steam which it overlies in the secondary side of the steam generator in order to maximize its water separation characteristics.

The means for varying the cross-sectional area of the steam outlet may include a plurality of annular inserts which are detachably mountable around the outlet of the housing in order to adjust its diameter. In the preferred embodiment, a series of three annular inserts are utilized which reduces the radius of the steam outlet one, two and three inches, respectively. Of course, any number of such annular inserts may be used to adjust the diameter of the outlet to any desired value. Each of these annular inserts may be formed from rings threaded around their outside diameters which are screwed into the threaded circumference of the steam outlet of the separator.

The pitched blade positioner preferably includes a pair of clamping assemblies connected on opposite sides of the pitched blades that are capable of securing these blades at a selected point along the longitudinal axis of the housing. In one embodiment, both the riser and the downcomer barrels that form the housing of the separator may include opposed, longitudinal slots for receiving the opposed clamping assemblies. Each of the clamping assemblies preferably includes a bar-shaped blade support member having an inner end that is connected to the pitched blades, and an outer end that extends through a slot in the riser barrel and abuts against the slot of the downcomer barrel. The outer ends of these blade support members include threaded bores for receiving a clamping bolt whose shank is insertable through the longitudinal slot in the downcomer barrel which overlies the longitudinal slot of the riser barrel. When this bolt is tightened, the outer end of its respective blade support members becomes frictionaly engaged against the inner diameter of the downcomer barrel, thereby securing the pitched blades at a selected position along the longitudinal slot in the separator housing. Additionally, strips of metal may be brazed or welded over the slots once the pitched blades are positioned in order to prevent unwanted flows of steam and water from occurring therethrough. In another embodiment, the longitudinal slot is eliminated in the downcomer barrel and dovetail sealing strips are provided in the slots of the riser barrel in order to cover them. These dovetail sealing strips are slidably movable within their respective slots so as to allow the clamping members to be positioned at any desired point along the slots in the riser barrel. Access to the clamping bolts of each of the clamping assemblies of this embodiment is accomplished by cutting a hole through the wall of the downcomer barrel that is adjacent to the clamping bolt of the assembly. Discs of metal may be weleded over these holes once the pitched blades have been adjusted to prevent any unwanted flows of steam or water therethrough. The use of dovetail sealing strips in this second embodiment minimizes the amount of brazing or welding that must be performed in order to effect a change in the position of the pitched blades.

The invention also encompasses a method for maximizing the separation characteristics of a swirl vane separator which generally includes the steps of adjusting the cross-sectional area of the steam outlet until the water separation attains a first maximum, and then adjusting the position of the pitched blades along the longitudinal axis of the separator until a second water separation maximum is attained. These two process steps may then be repeated in order to compensate for any dependencies or cross talk between the two parameters being maximized. Finally, if the adjustment of the pitched blades has been by means of the apparatus of the invention previously described, the slots or holes present in the downcomer barrel are then preferably sealed by brazing or welding metal strips or circular plates thereover.

BRIEF DESCRIPTION OF THE SEVERAL FIGURES

Figure 10:
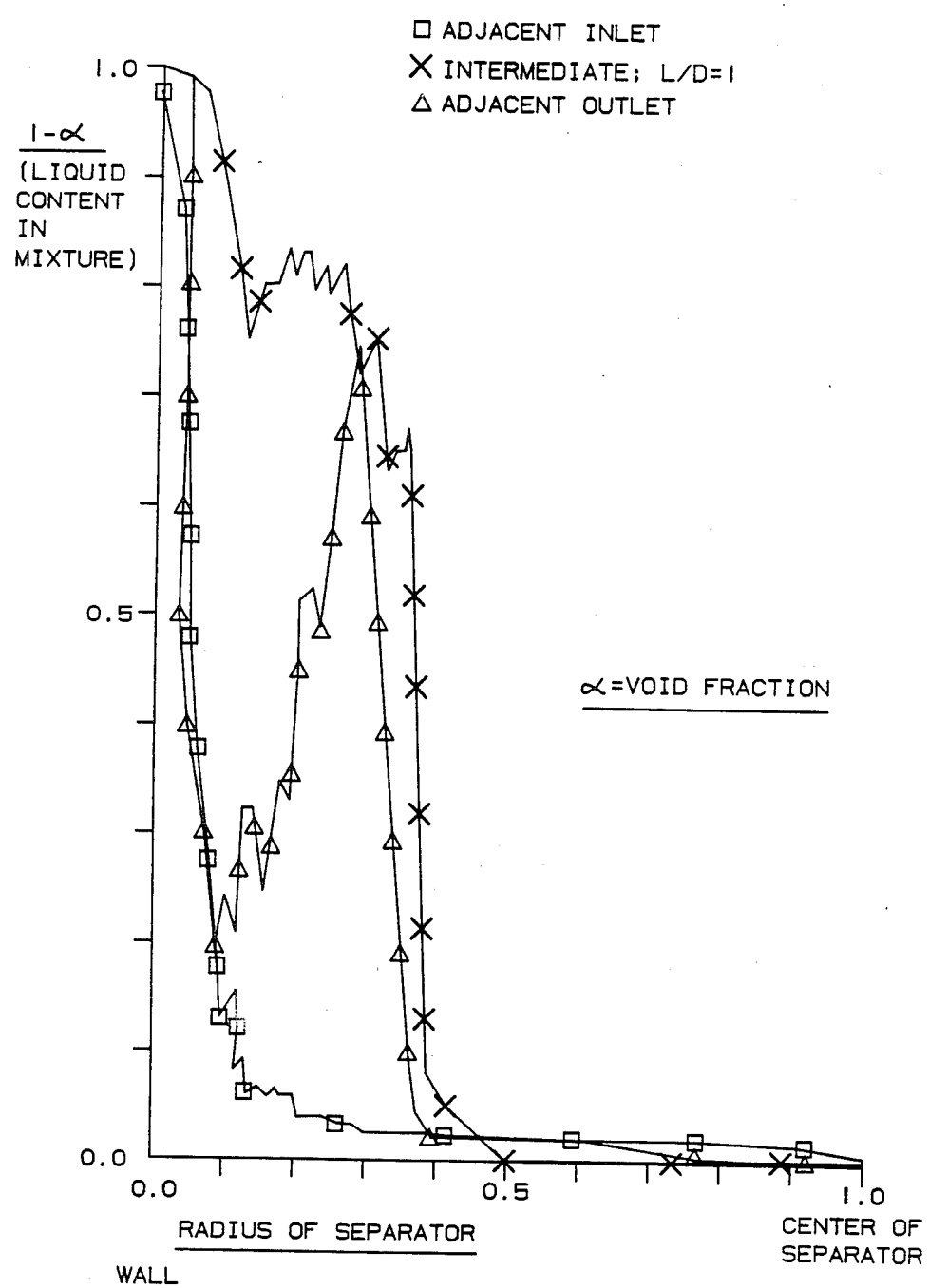
Figure 11:
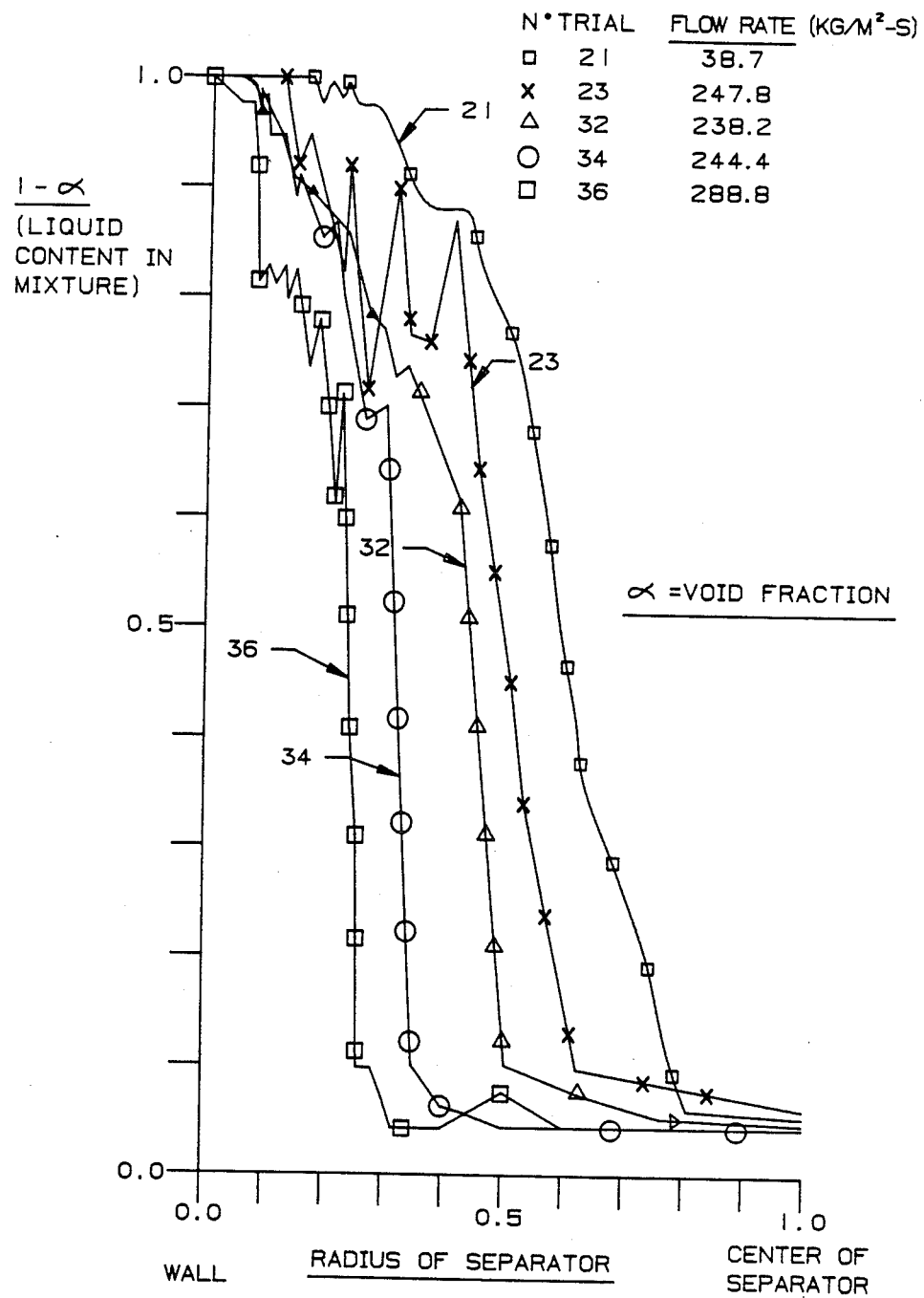

FIG. 10 is a graph illustrating the relationship between the concentration of water droplets along the radius of the separator and the position of the set of pitched blades along the longitudinal axis of the housing of the separator, and FIG. 11 is a graph illustrating the relationship between the concentration of water droplets along the radius of the separator and the flow rate of the wet steam passing through the separator.

DETAILED DESCRIPTION OF THE PREFERRED EMBODIMENT

General Overview of the Structure and Operation of the Invention

Figure 1:
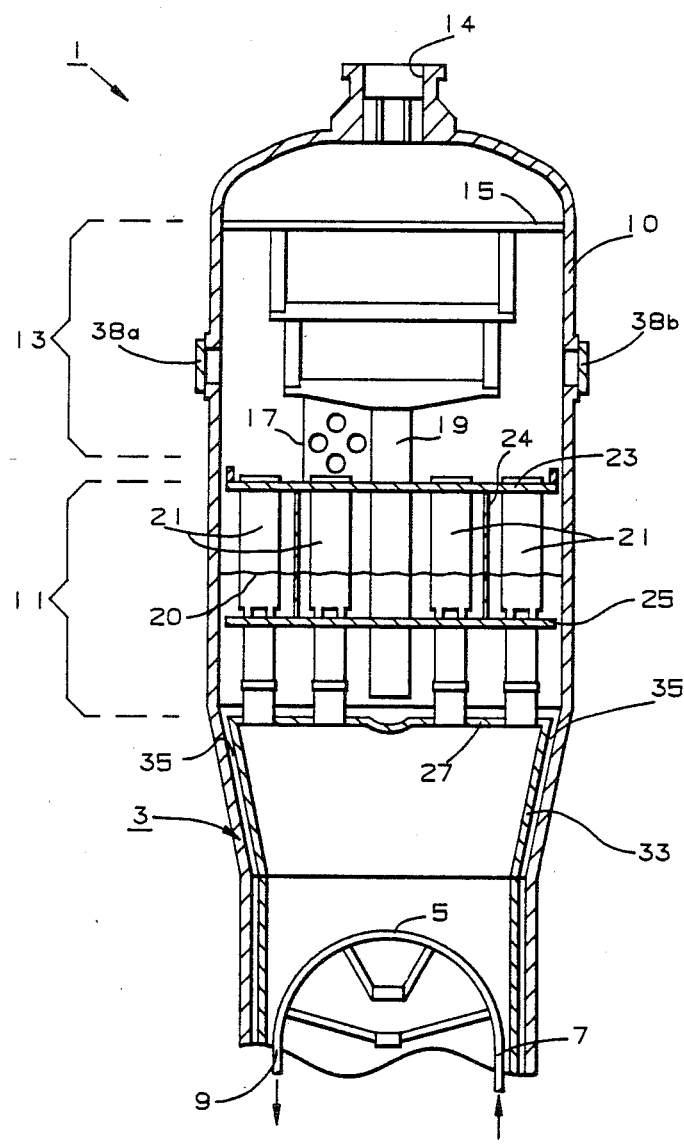
FIG. 1 is a cross-sectional side view of the upper end of the secondary side of a nuclear steam generator, showing both the primary and secondary separator banks which dry the steam generated thereby.
Figure 2:
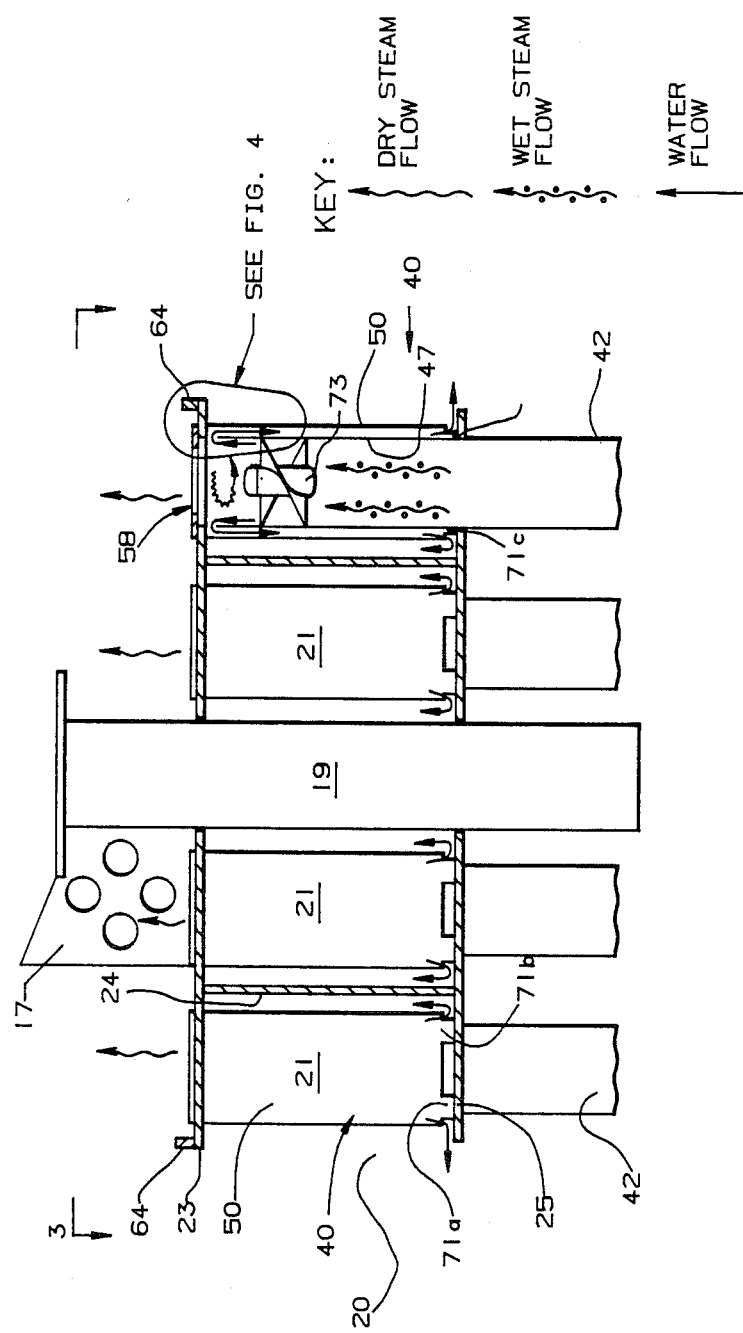
FIG. 2 is an enlarged cross-sectional side view of the primary separator bank illustrated in FIG. 1, showing one of the swirl vane separators thereof in cross-section.
Figure 3:
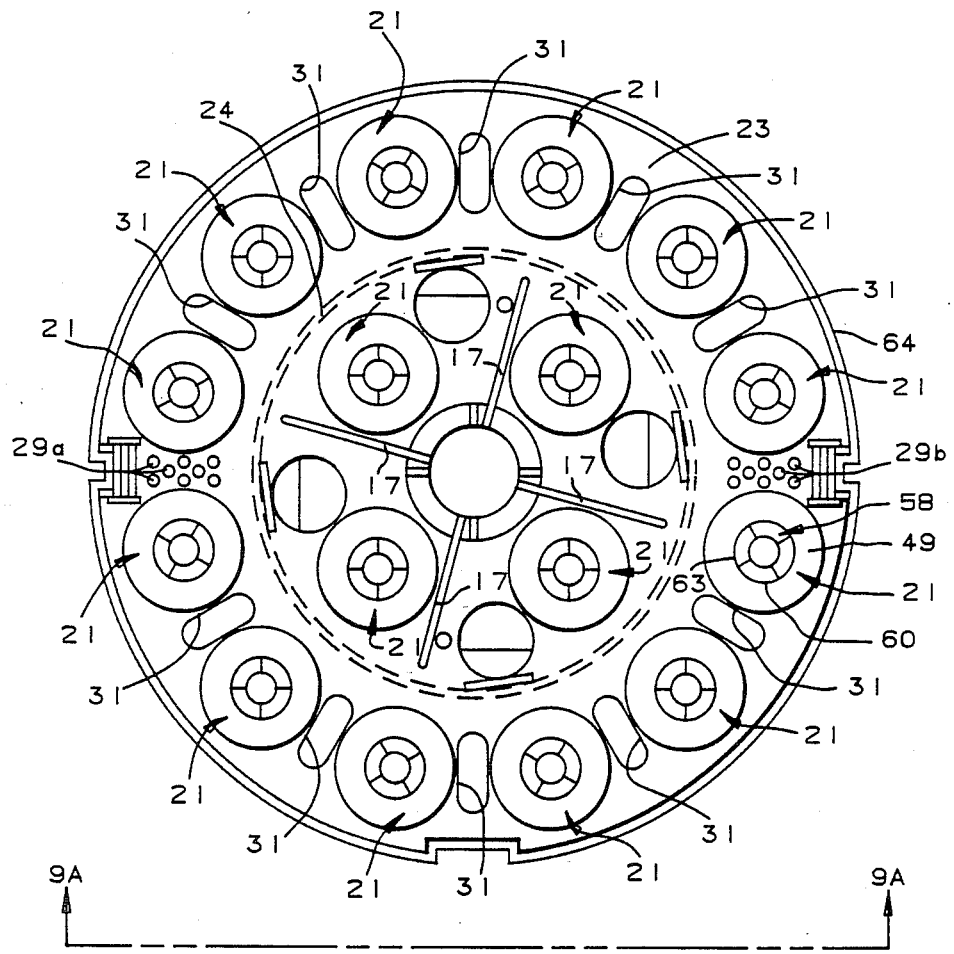
FIG. 3 is a plan view of the primary separator bank illustrated in FIG. 2 along the line 3—3.

With reference to FIGS. 1, 2 and 3, wherein like figures denote like components throughout all the several figures, the improved swirl vane steam drying apparatus of the invention is particularly adapted for use within a nuclear steam generator 1. Such nuclear steam generators have a secondary side 3 which houses a bundle of U-shaped heat exchange tubes 5 that convert nonradioactive water into steam. Only one such tube 5 is shown in FIG. 1 for simplicity. Each of the U-shaped heat exchange tubes 5 forming the tube bundle includes a "hot leg" 7 and a "cold leg" 9 that are mounted in a tubesheet (not shown) which hydraulically separates the secondary side 3 of the generator 1 from its primary side. In the steam generator 1 illustrated in FIG. 1, all of the hot legs 7 are located in the left-hand side of the secondary side 3, while all the cold legs 9 are located in the right-hand side. Hot, radioactive water from the primary side of the generator 1 initially flows into the open end of the hot leg 7 of each tube 5, circulates completely around the U-bend of the tube 5, and then flows through the cold leg 9 and ultimately back out of the tubesheet of the generator 1. Since each of these U-shaped heat exchange tubes 5 is completely immersed in the water which fills most of the secondary side 3 of the steam generator 1, the hot, radioactive water initially introduced into the hot leg 7 of the tube 5 cools as it circulates around the U-shaped tube 5, thereby creating a significant heat gradient in the steam produced across the diameter of the plenum 10 from the hot leg side to the cold leg side. As will be discussed in more detail hereinafter, applicant has found that this heat gradient substantially affects the properties of the steam generated over the hot legs 7 and cold legs 9 of the tubes 5.

In order to separate the water droplets entrained in the wet steam generated by the U-shaped heat exchange tubes 5, a primary separator bank 11 and a secondary separator bank 13 are provided in the lower and upper portions of the plenum 10 of the generator 1, respectively. Generally speaking, the secondary separator bank 13 consists of an array of vanes which define a convoluted path for the wet steam to traverse before exiting the plenum at the centrally disposed outlet 14. This configuration of blades is supported at its upper end by a support plate 15, and at its lower end by a configuration of four, orthogonally disposed support gussets 17. A center drainpipe 19 extends downwardly below the water level 20 in the plenum 10 in order to return the moisture separated from the steam rising therethrough back to the water supply in the secondary side 3 of the generator 1.

As is best seen in FIG. 3, the primary separator bank 11 typically includes a dual-circular array of sixteen swirl vane separators 21. Each of these separators 21 is generally elongated in shape, and is mounted in parallel with the longitudinal axis of the secondary side 3 of the generator 1 by means of an upper deck plate 23 and a middle deck plate 25 which supports the outlet end and the middle sections of each of the separators 21, respectively. To further rigidify the primary separator bank 11, an annular support wall 24 interconnects the upper and middle deck plates 23, 25. To further support the separators 21, a lower support plate 27 is also provided across the bottom of the plenum 10 as shown. The upper deck plate 23 includes two opposed arrays fo downcomer pipes 29a, 29b for returning condensed water droplets that fall from the secondary separator bank 13 back to the water supply in the secondary side 3 of the generator 1. The upper deck plate 23 also is provided with a uniform array of steam vents 31 disposed between each of the separators 21 in the outside circle of separators. These steam vents 31 permit moisture-laden steam to vent from the space between the water level 20 and the deck plate 23 in the secondary side 3 of the generator 1, and also prevent any potentially damaging pressure differentials from being created between the upper deck plate 23, and the steam flowing thereunder.

Turning back to FIG. 1, the lower support plate 27 that helps support the separators 21 in the primary separator bank 11 is in turn supported around the edge of the tube bundle wrapper 33 of the generator 1. Wrapper 33 is a metallic wall that is concentrically disposed within the interior of the secondary side 3 of the generator 1. A downcomer path 35 is defined in the annulus between the outer surface of the tube wrapper bundle 33, and the inner surface of the secondary side 3 of the generator 1. This downcomer path 35 provides a flowpath for the cooler, condensed water to be reintroduced against the hot walls of the heat exchange tubes 5. Finally, near the upper end of the plenum 10 of the steam generator 1, a pair of manways 38a, 38b is provided. While these manways provide sufficient room for a man to enter the plenum 10 of the generator 1 in the event that a repair is necessary, they are typically not large enough to allow any of the swirl vane separators 21 to be completely removed from the generator 1. As will be seen hereinafter, the invention obviates many of the problems which arise from this fact.

Figures 4, 6:
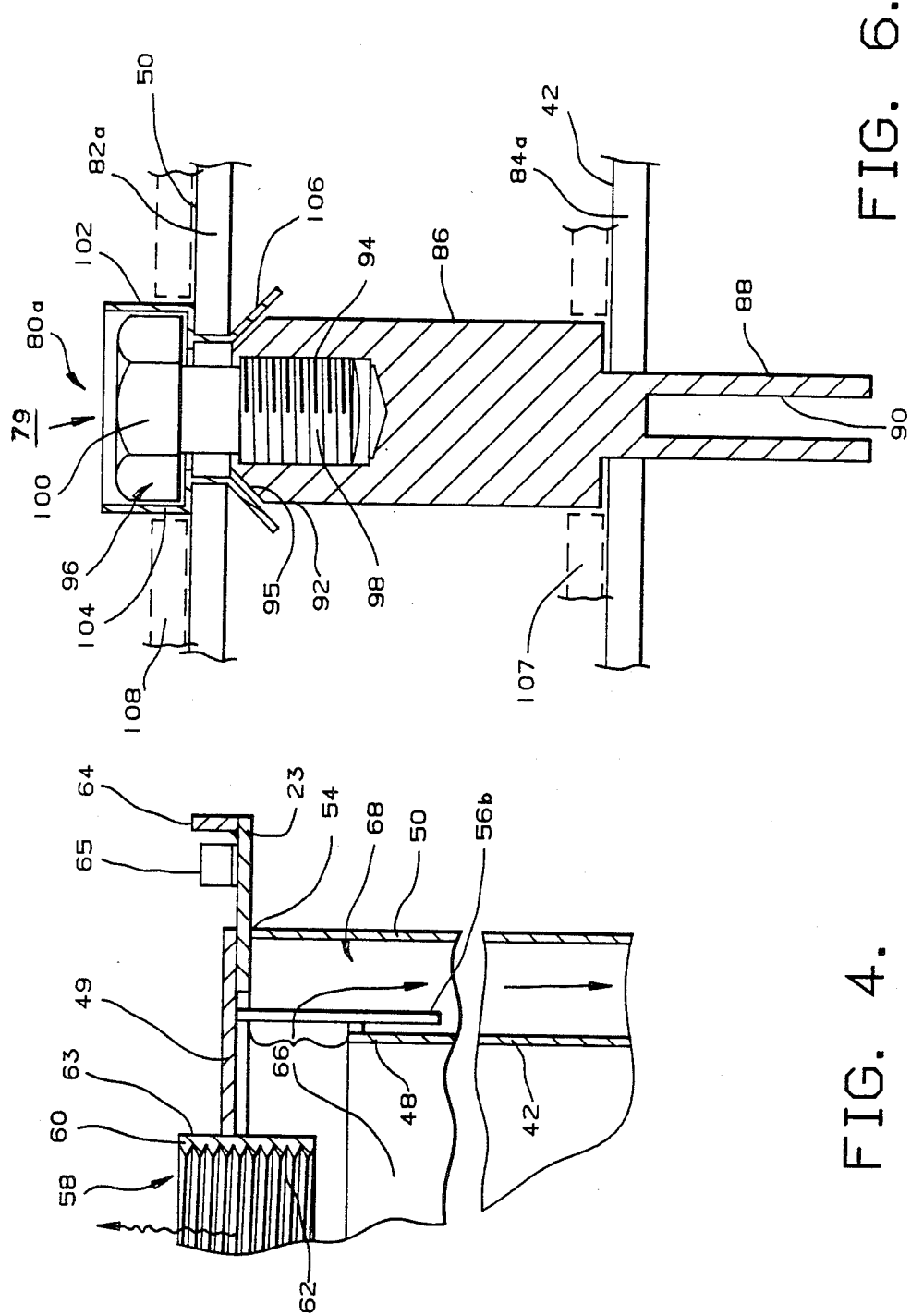
FIG. 4 is an enlarged view of the circled section of the swirl vane separator illustrated in FIG. 2.
FIG. 6 is an enlarged, cross-sectional side view of one of the clamping assemblies utilized in the improved swirl vane separator illustrated in FIGS. 5A and 5B.
Figure 5A:
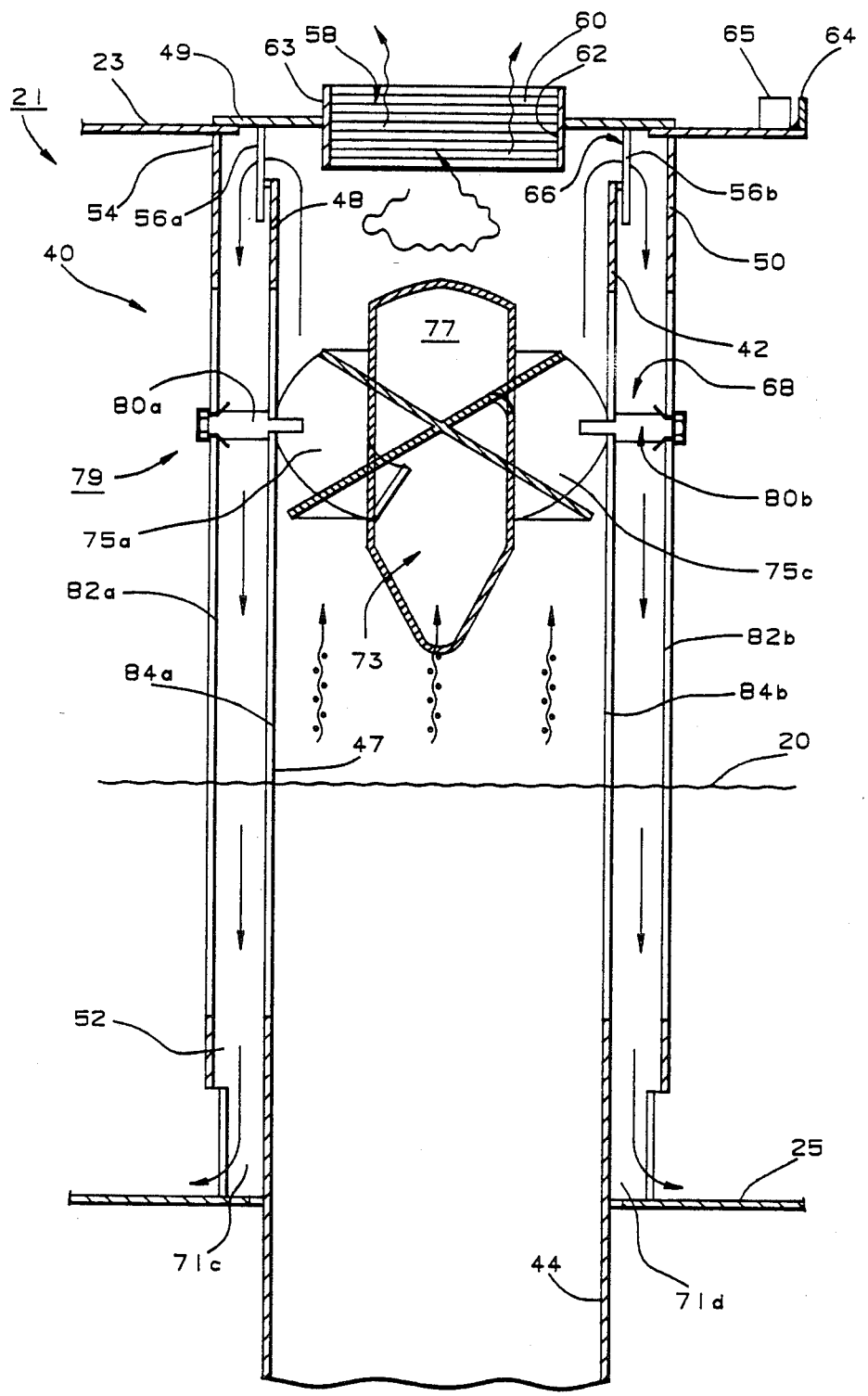
FIG. 5A is a cross-sectional side view of one embodiment of the improved swirl vane separator of the invention.

With specific reference now to FIGS. 2, 4 and 5A, the improved swirl vane separator 21 of the invention comprises an elongated, cylindrical housing 40 which includes a riser barrel 42 that is circumscribed by a downcomer barrel 50 over the upper and middle portions of its exterior. The riser barrel 42 is vertically positioned, and includes an inlet or lower end 44 that is submerged below the water line 20 in the plenum 10 of the steam generator 1. A steam inlet 47 is defined within the riser barrel 42 in the interior of the barrel just above the water level 20. The outlet or upper end 48 of the riser barrel 42 terminates two or three inches below the cap 49 of the downcomer barrel 50 which concentrically surrounds the riser barrel 42 as shown. More specifically, the lower end 52 of the downcomer barrel 50 extends down about three-quarters of the length of the riser barrel 42, while the upper end 54 is welded around the previously mentioned upper guard plate 23 which in turn abuts the previously mentioned cap 49. As may be seen best with respect to FIG. 5A, the upper end 48 of the riser barrel is suspended from the bottom surface of the cap 49 by a plurality of riser barrel brackets 56a, 56b. Discrete brackets are used in lieu of an annular support ring in order to provide a number of arcuate gaps between the edge of the upper end 48 of the riser barrel, and the bottom surface of the cap 49. These gaps define a downcomer opening 66 whose function will be described in more detail presently. The cap 49 which overlies the riser and downcomer barrels 42, 50 of the separator 21 includes a centrally disposed steam outlet 58. Outlet 58 is formed from an outlet ring 60 having both an annular interior 62 that is threaded for a purpose which will be explained presently, as well as an annular shoulder 63 which extends above the upper surface of the cap 49 as shown. Peripherally disposed around the edge of plate 23 is a gutter flange 64 that is preferably welded thereto to effect a watertight joint. Together, the annular shoulder 63 of the separator outlet rings 60 and the gutter flange 64 define a shallow gutter on top of the plate 23 where condensed water will not mix with steam venting through steam outlets 58 and 31. To monitor the rate at which this condensed water is collected between the shoulder 63 and flange 64, a water level detector 65 (shown schematically) is placed therein. In the preferred embodiment, the water level detector 65 is a pair of static pressure taps connected to a differential pressure cell (not shown) located outside the generator 1.

Turning now to FIGS. 4 and 5A and a description of the condensate flow path within the housing 40 of the separator 21 itself, the previously mentioned gap between the edge of the upper end 48 of the riser barrel 42 and the lower surface of the cap 62 defines a downcomer opening 66. The downcomer opening 66 communicates with a downcomer annulus 68 formed between the outer walls of the riser barrel 42, and the inner walls of the downcomer barrel 50. The bottom end of the downcomer annulus 68 communicates with the water supply in the plenum 10 of the steam generator 1 through gaps defined between the support legs 71a, 71b, 71c, and 71d present around the downstream end 52 of downcomer barrel 50. Each of these legs 71a, 71b, 71c and 71d rests firmly on the middle deck plate 25 and thereby helps to support the barrel 50. Each of the legs 71a, 71b, 71c and 71d are preferably arcuate-shaped leg members that are integrally formed with the lower end 52 of the downcomer barrel 50.

In the interior of the housing 40 of the separator 21, a set of pitched blades 73 are mounted in order to impart a radial component of motion in the wet steam flowing therethrough. Specifically, the set of pitched blades 73 includes four blades 75a, 75b, 75c and 75d, each of which is pitched between 30° and 37° to the horizontal. While pitches less than 30° and greater than 37° would be operable, pitches smaller than 30° are generally undesirable due to the flow resistance they exert on the steam rising therethrough, while pitches greater than 37° generally do not impart a large enough radial component of motion to the water droplets in the steam to fling them into the downcomer opening 66 within the housing 40 of the separator 21. At their inner ends, each of the blades 75a, 75b, 75c and 75d is mounted around an aerodynamically shaped hub member 77.

FIG. 5A also illustrates the operation of the steam generator 21. In such a separator 21, wet steam (schematically represented by the dotted, wavy arrows) rises within the riser barrel 42 from the downstream end 44 thereof and into the pitched blades 75–75d of the blade set 73. Because the flow rate of the wet steam mixture in such generators 1 is typically on the order of 10 feet per second, the blade set 73 imparts a considerable radial current in both the steam and water droplets entrained therein that flow downstream of the blade set 73. This radial component of motion causes the relatively heavy water droplets to adopt a trajectory that resembles a conical helix which ultimately intersects with the inner walls of the housing 40 of the separator 21. If the internal geometry of the separator 1 is well matched to the flow rate and wetness of the steam traveling therethrough, most of these water droplets will be captured in the downcomer opening 66 defined between the edge of the upper end 48 of the riser barrel and the lower surface of the cap 49. The end result will be a flow of substantially dried steam out of the steam outlet 58 of the cap 49 of the separator 21 (represented by the undotted wavy arrows), along with a downward flow of condensed water through the downcomer annulus 68 and back into the water supply in the plenum 10. However, if the internal geometry of the separator 21 is not well tuned to the characteristics of the steam flowing therethrough, an unacceptable amount of water droplets will escape through the steam outlet 58.

Applicant's invention allows each of the separators 21 in a primary separator bank 11 to be fine tuned to the specific characteristics of steam it receives from the heat exchange tubes 5 of the secondary side 3 that it overlies by the provision of a blade positioning mechanism 79, and a set of annular inserts 120 of adjusting the diameter of the steam outlet 58. The blade positioning mechanism 79 includes a pair of clamping assemblies 80a, 80b that allow the blade set 73 to be positioned at a desired point along the longitudinal axis of the housing 40 (see FIGS. 5A and 7A), and the annular inserts (see FIG. 8B) may be screwed into the steam outlet 58 to vary the cross-sectional diameter thereof.

Specific Description of the Apparatus and Method of the Invention

Figure 5B:
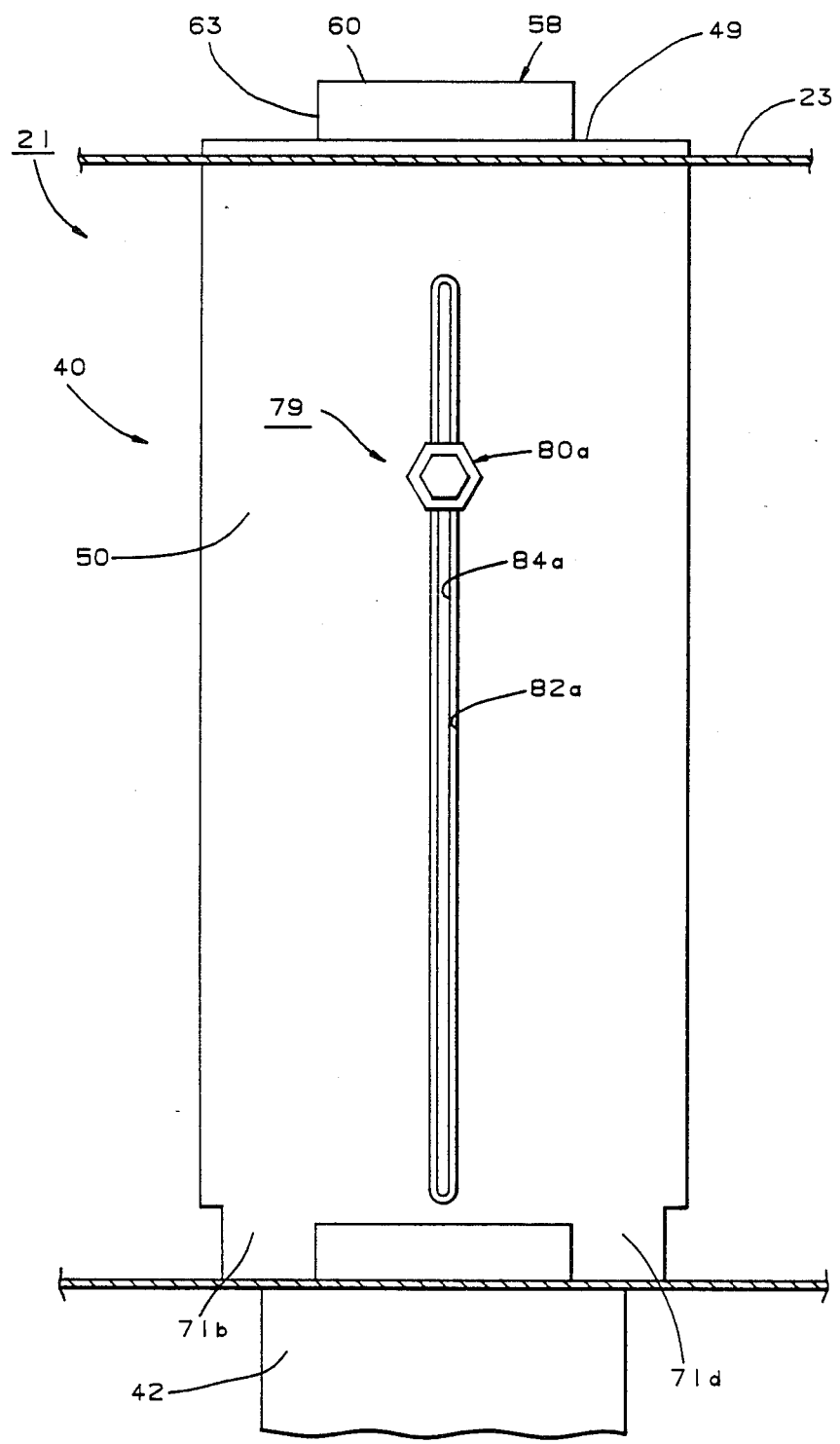
FIG. 5B is a side view of the swirl vane separator illustrated in FIG. 5A turned 90°.

With reference now to FIGS. 5A, 5B and FIG. 6, one preferred embodiment of the blade positioning mechanism 79 of the invention includes clamping assemblies 80a, 80b that operate in conjunction with a pair of opposing slots 82a, 82b and 84a, and 84b present in the downcomer barrel 50 and riser barrel 42, respectively. The opposing slots 82a, 82b in the downcomer barrel are in alignment with the pair of opposing slots 84a, 84b present in the riser barrel 42. As is best seen with respect to FIG. 5B, each of the slots 82a, 82b in the riser barrel 50 is larger than and completely exposes the corresponding smaller slots 84a, 84b in the riser barrel 42, so that access to the smaller slots 84a, 84b may be had through the larger slots 82a, 82b. The specific advantages associated with having the downcomer slots 82a, 82b larger than the riser barrel slots 84a, 84b will become evident presently.

FIG. 6 illustrates the structure of each of the clamping assemblies 80a, 80b which are used in this first embodiment of the invention. Each of these clamping assemblies 80a, 80b includes a bar-shaped, blade support member 86. The inner end 88 of the blade support member 86 is formed with a reduced diameter in order that it may be easily inserted through its respective slot 84a, 84b present in the riser barrel 42. This reduced-diameter, inner end 88 includes a slot 90 for receiving the edges of one of two opposing blades in the blade set 73. Preferably, the inner end 88 is welded onto its respective blade 75a in the position illustrated in FIG. 5A. The outer end 92 of the blade support member 86 includes a threaded bore 94 for receiving the threaded shank 98 of a clamping bolt 96. This bore 94 is circumscribed by a tapered shoulder 95 that defines the edge of the outer end 92 of the blade support member 86. As is illustrated in FIG. 6, the shank 98 of the bolt 96 extends through the slot 82a in the downcomer barrel 50, while the head 100 does not, its diameter being significantly larger than the width of the slot 82a which it overlies. Consequently, when the head 100 of the clamping bolt 96 is tightened, the tapered shoulder 95 located at the outer end 92 of the blade support member 86 will be wedged against the sides of the slot 82a in frictional engagement. Hence, in order to secure the blade set 73 at a selected point along the longitudinal axis of the housing 40 of the separator 21, all that is necessary is to loosen the bolt 96, slide the blade set 73 at the desired point, and then tighten the bolt 96 until the tapered shoulder 95 snugly engages the sides of the slot 82a. In order to prevent the bolt 96 from loosening once the blade set 73 has been placed at a desired position, a locking cup 102 is provided. This locking cup 102 includes an hexagonally shaped cup 104 that surrounds the hexagonal perimeter of the head 100 of the bolt 96, as well as a flared skirt 106 that circumscribes the tapered shoulder 95 of the support member 86. The locking cup 102 functions much like a lock washer in securing the bolt 96 relative to the blade support member 86. The final components of the blade positioning mechanism are the metallic sealing strips 107 and 108 shown in FIG. 6. These strips are brazed or welded over the riser barrel slots 84a, 84b and then over downcomer barrel slots 82a, 82b after the clamping assemblies 80a, 80b have been moved to their final positions in order to preserve the integrity of the downcomer flow path 68 through the housing 40.

Figure 7A:
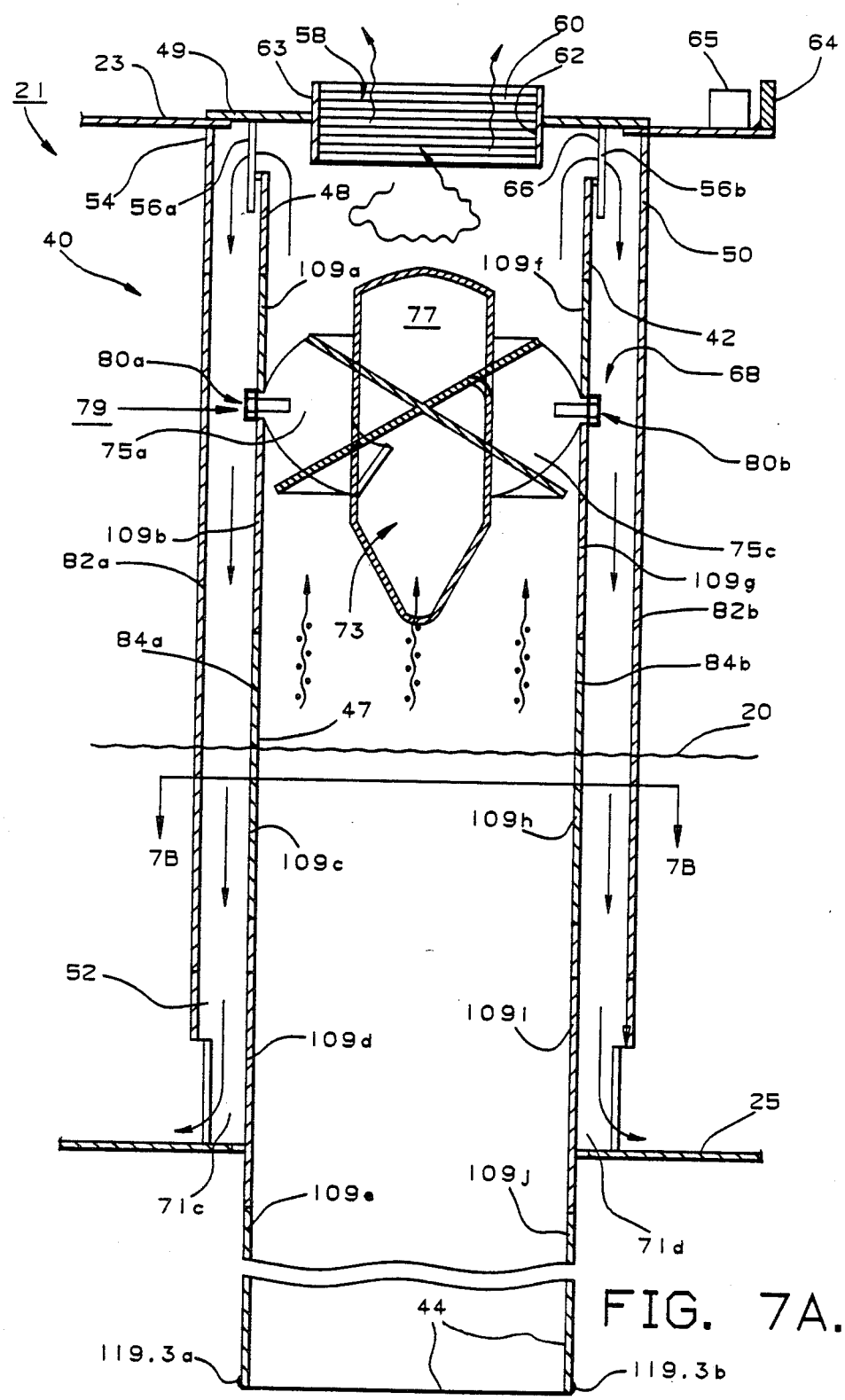
FIG. 7A is a cross-sectional side view of an alternative embodiment of the improved swirl vane separator of the invention.
Figure 7B:
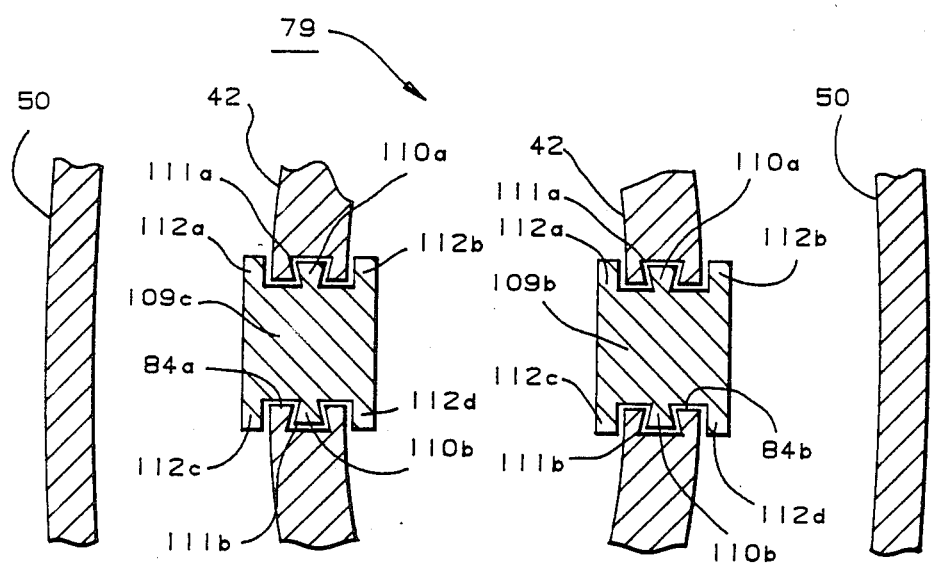
FIG. 7B is a cross-sectional plan view of the swirl vane separator of FIG. 7A across the line 7B—7B.
Figure 7C:
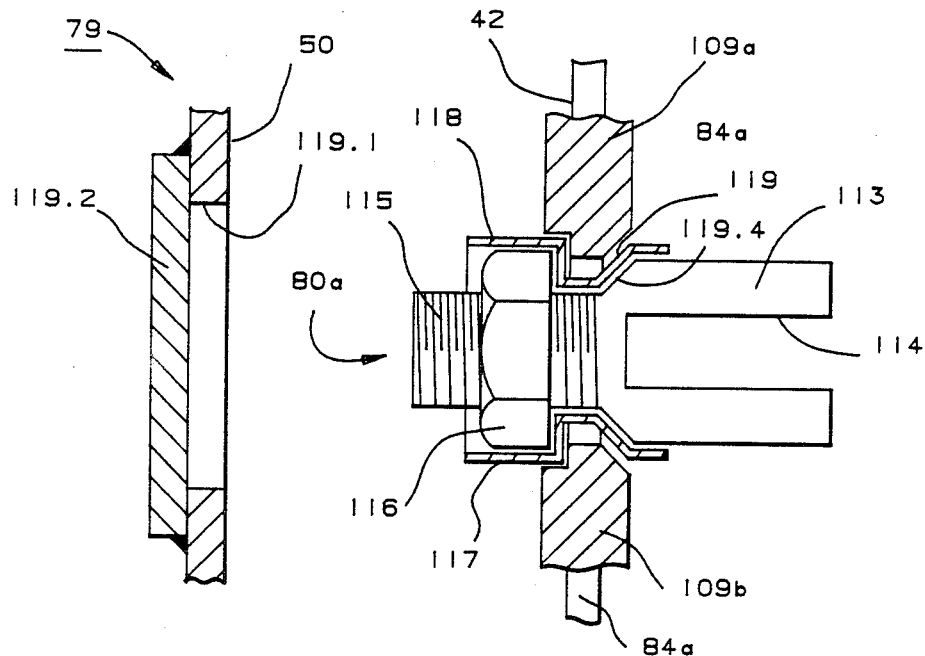
FIG. 7C is an enlarged view of the clamping assemblies utilized in the swirl vane separator illustrated in FIGS. 7A and 7B.

FIGS. 7A, 7B and 7C illustrate an alternative embodiment of the blade positioning mechanism 79 of the invention. In this embodiment, the longitudinal slots 82a, 82b in the downcomer barrel 50 are eliminated. Additionally, the clamping assemblies 80a, 80b have a simplified structure, as will be discussed in more detail hereinafter. Finally, the previously mentioned metallic strips 107 and 108 that were brazed over the riser barrel slots 84a, 84b and downcomer barrel slots 82a, 82b are replaced by dovetail sealing strips 109a–109j and metallic discs 119.2. These sealing strips 109a–109j are fabricated in relatively short, uniform lengths (which may be ten inches or so) so that they may be easily installed or removed from their respective slots. In this embodiment, the longitudinal slots 84a, 84b in the riser barrel 42 extend all the way down to the bottom edge 44 of the barrel 42 so that the sealing strips 109a–109j can be inserted into the slots 84a, 84b from the bottom edge 44 of the barrel 42, and slid upwardly into their final positions within these slots.

With reference now to FIGS. 7A and 7B, each of the dovetail sealing strips 109a–109j includes a pair of opposing, dovetail rail members 110a, 110b. The dovetail rail members 110a, 110b are complementary in shape to dovetail slots 111a, 111b which are present in the opposing edges of the slots 84a, 84b in the riser barrel 42. These dovetail rail members 110a, 110b interlock with the dovetail slots 111a, 111b when the sealing strips 109a–109j are slid up through the bottom edge of the riser barrel 42. Such interlocking provides mechanical strength to the riser barrel 42 while also creating a water seal across the slots 84a, 84b. To enhance the water seal provided by the interlocking dovetail rail members 110a, 110b and slots 111a, 111b, rectangular flanges 112a–112d are provided at each of the four corners of each sealing strip 109a–109j. These flanges 112a–112d are machined so that they conform closely to the edges of the slots 84a, 84b. These flanges 112a–112d, in combination with the dovetail rail members 110a, 110b create what amounts to a watertight seal across the walls of the riser barrel 42 by providing only a very narrow and tortuous route between the dovetail rail members 110a, 110b and the slots 84a, 84b.

FIG. 7C illustrates the modified structure of the clamping assemblies 80a, 80b utilized in the second embodiment of the blade positioning mechanism 79 of the invention. Each of these clamping assemblies 80a, 80b includes a bar-shaped blade support member 113 as shown. This member 113 further includes a centrally disposed slot 114 for capturing the edges of one of the two opposed blades 75a, 75c of the set 73 of pitched blades. In the preferred embodiment, the bar-shaped, blade support member 113 is welded onto these blades. On its outer end, each of the clamping assemblies 80a, 80b includes a clamping stud 115 which is threadedly engaged by a clamping nut 116. A locking cup 117 having a hexagonally shaped cup 118 for receiving the clamping nut 116 is also provided. Like the locking cup 102 utilized in the previously described clamping assemblies 180a, 180b, this locking cup 117 also includes a conical skirt 119 which functions much like a lock washer when the clamping nut 116 is screwed into the position illustrated. Skirt 119 is complementary in shape to a conical shoulder 119.4 located around the middle of member 113.

In the initial assembly of the blade positioning mechanism 79 of the second embodiment, dovetail sealing strips 109a and 109f are first inserted in the slots 84a, 84b, respectively. The length of these strips is chosen so that, when the blade set 73 is slid upwardly into the riser barrel 42 with opposing blade support members 113 attached thereto, the blade set 73 will arrive at a first selected position when the clamping studs 115 abut the bottom ends of the sealing strips 109a and 109f. At this point, the blade set 73 is mounted into position within the housing 40 by means of the clamping nuts 116. In order to gain access to the clamping nuts 118, holes 119.1 are cut through the outer wall of the downcomer barrel 50 by means of a trepanning tool that operates much like a can opener in order to minimize the production of metallic chips. After these nuts 118 have been tightened, additional dovetail sealing strips 109b–109e, and 109g–109j are inserted into the slots 84a, 84b. Next, discs 119.2 of metal are brazed over the access holes 119.1. Finally, weldments 119.3a, 119.3b are provided along the bottom edge 44 of the riser barrel 42 in order to mechanically secure the bottommost sealing strips 109e, 109j to the barrel 42.

Figure 8B:
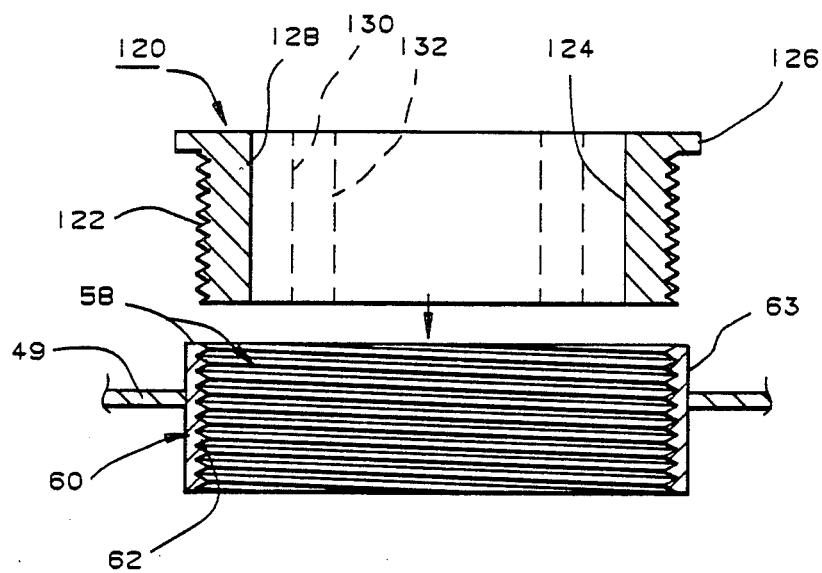
FIG. 8B is a cross-sectional side view of the annular insert illustrated in FIG. 8A, illustrating how it may be screwed into the threaded interior of the steam outlet of the separator.
Figure 8A:
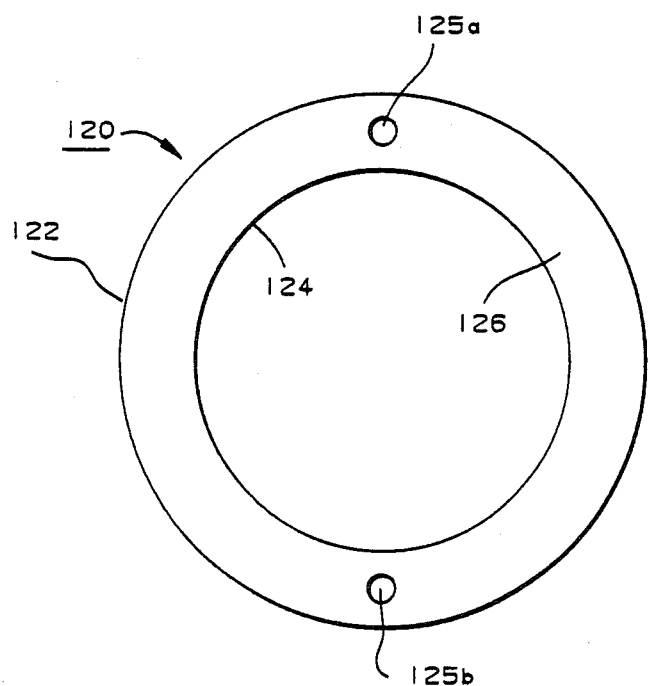
FIG. 8A is a top plan view of one of the annular inserts used to vary the cross-sectional diameter of the steam outlet of the improved swirl vane separator.

FIGS. 8A and 8B illustrate the plurality of annular inserts 120 which are used to adjust the cross-sectional diameter of the steam outlet 58 of a separator 21. Each of these annular inserts 120 is a ring-shaped member having a threaded outer diameter 122, and a smooth inner diameter 124. On its upper surface, each annular insert 120 includes a pair of opposing bores 125a, 125b for receiving the prongs of a wrench (not shown). Additionally, as may best be seen in FIG. 8B, the upper edge of each of the annular inserts 120 is circumscribed by a retaining shoulder 126. Shoulder 126 prevents the insert 120 from being screwed too deeply into the mouth of the threaded steam outlet 58. In the preferred embodiment, three annular inserts 120 are provided for reducing the diameter of the steam outlet 58 by two inch, four inches, and six inches, respectively. The locations of the inner diameters for the four- and six-inch annular inserts are indicated in phantom as lines 130 and 132, respectively, in FIG. 8B.

In the preferred method of the invention, both the longitudinal position of the blade set 73 and the cross-sectional area of the steam outlet 58 for each of the swirl vane separators 21 in the primary separator bank 11 is adjusted for the actual start-up of the steam generator 1 in accordance with the best available hot leg-cold leg profiles and void fraction profiles available from similarly constructed steam generators. Examples of such profiles are illustrated in FIGS. 9A, 9B, 10 and 11.

Figure 9B:
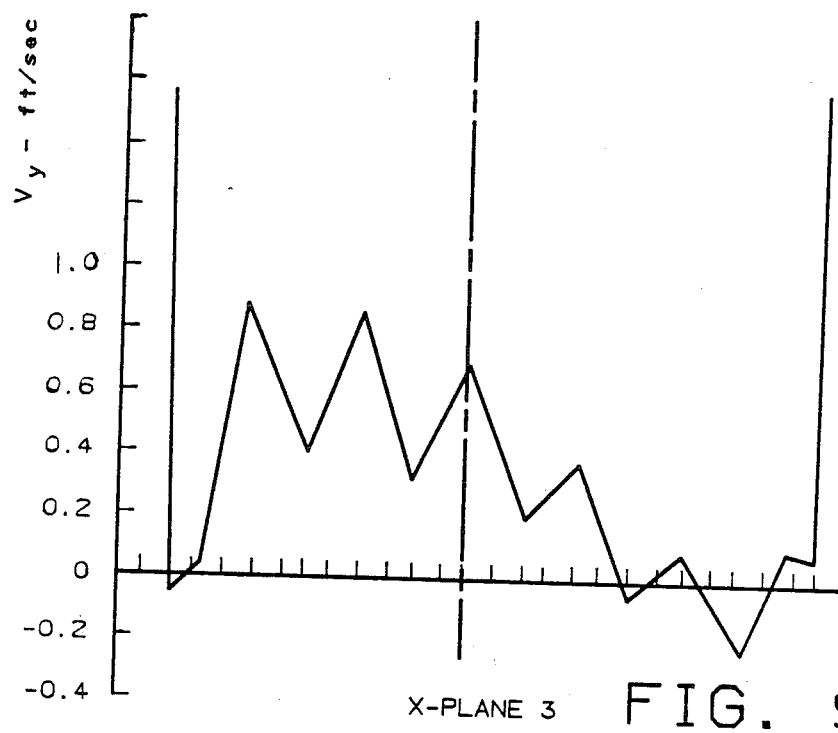
FIGS. 9A and 9B are graphs illustrating the relationship between the lateral and axial velocities of the steam in the plenum above the U-bend tubes with respect to the position of the hot leg and cold leg sides of the tube bundle.
Figure 9A:
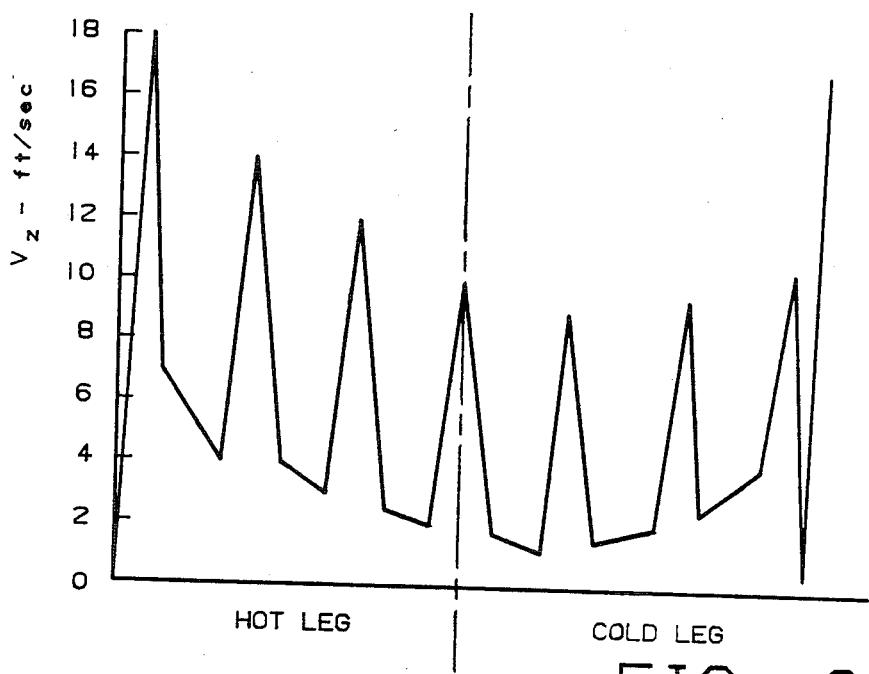

FIGS. 9A and 9B illustrate the substantial differences in flow rate of the steam across the diameter of the plenum 10 of the steam generator 1 not only with respect to the steam flow along the Z (or vertical) axis, but also with respect to the steam flow along the Y (or lateral) axis. In FIG. 9A, the Z-axis steam flow is irregular across the plenum 10, in that it arrives at seven local maxima as shown. The existence of these flow rate maxima may be easily understood if FIG. 9A is viewed in connection with FIG. 3. If one were to look at the structure of FIG. 3A along the side as suggested by the line 9A—9A, one would see roughly seven swirl vane separators 21 from left to right. There are more than seven such separators, of course, but only seven are seen as some separators in the foreground eclipse the separators behind them. The line 9A—9A corresponds to the ordinate of the graph illustrated in FIG. 9A. The seven local maxima visible in FIG. 9A result from the fact that the steam flowing out of the secondary side 3 and up through the primary bank 11 of separators 21 flows with the least resistance where it is aligned with the inlet of a swirl vane separator 21. In all other places, its flow rate is retarded due to the presence of the guard plates 23, 25 and 27 across the plenum 10. In the graph of FIG. 9A, the flow rates are higher, on the average, on the hot leg side of the generator 1 than they are on the cold leg side. Surprisingly, the data in this graph show that the range of speed on the hot leg side varies from between about 10 to 18 feet per second, while the range of flow rate on the cold leg side varies only between about 9 and 11 feet per second. The data illustrated in FIG. 9B also illustrate some surprising results; i.e., that there is typically a significant lateral component of motion in the steam that accompanies its vertical component of motion as it flows in the plenum above the tube handle. While this lateral component is near zero in the midportion of the cold leg side of the generator 1, it is close to one foot per second across the hot leg side of the generator 1.

The graphs in FIGS. 10 and 11 illustrate what is known as the void fraction of the engrained moisture in the steam relative to the radius of the swirl vane separator 21. Generally speaking, the closer this void fraction approaches zero as the radius approaches zero, the more closely the entrained water droplets in the steam are being concentrated toward the inner walls of the housing 40 and into the downcomer opening 66. This graph clearly illustrates that a position of the blade set 73 adjacent to the inlet (see graph designated by squares) results in a void fraction profile wherein the great majority of the moisture in the steam is concentrated toward the inner walls of the housing 40 of the separator 21 which, of course, is desirable. FIG. 11 illustrates how the void fraction of the steam-water mixture varies with the flow rate of the wet steam through the separator 21 which in turn is dependent upon the diameter of the steam outlet. From this graph, it is apparent that the void fraction of the steam-water mixture is at its lowest value when the diameter of this outlet is adjusted so that the flow rate of the wet steam passing through the separator 21 is approximately 288.8 kilograms per square meter per second (see graph 36 designated by large squares).

After the best available hot leg-cold leg profiles and void fraction profiles have been studied, each of the separators 21 in bank 11 is assembled with its blade set 73 and steam outlet 58 positioned and adjusted in accordance with the specific characteristics of the steam flow which it will individually overlie. If the first embodiment of the invention is used, strips 110 and 112 are brazed across the opposing slots 82a, 82b of the downcomer barrel and 84a, 84b of the riser barrel 42. If the second embodiment of the invention is utilized, dovetail sealing strips 109a–109j are inserted within the slots 84a, 84b of the riser barrel 42, and secured to the edge 44 thereof by weldments 119.3a, 119.3b. In both embodiments, an annular insert 120 is screwed into the threaded interior 62 of the outlet ring 60 so that the resulting steam flow corresponds to the most advantageous void fraction profile.

The separators 21 are then installed in the plenum 10 of the steam generator 1, along with the previously mentioned water level detector 65. The steam generator 1 is then tentatively started up. At this time, both moisture carryover in the steam passing through outlet 14 is monitored, as well as the rate at which water accumulates on the upper deck plate 23. If, on the basis of the monitoring of the moisture carryover and the water level on the top of the deck plate 23, it becomes apparent that one or more of the separators 21 is not well tuned to the characteristics of the steam passing through it, the steam generator 1 is shut down. Maintenance operators then enter the manways 38a, 38b of the plenum 10, and readjust the position of the blade sets 73 by removing either the brazed strips 107 and 108, or the dovetail sealing strips 109a-109j (depending on the embodiment of the invention utilized). If the second embodiment of the invention is used, access is obtained to the clamping nut 116 by cutting access holes 119.1 in the downcomer barrel 50 in the manner previously described. The blade sets 73 are then repositioned, and the sealing strips 107 and 108 or dovetail sealing strips 109a-109j are replaced. Additionally, the diameter of the steam outlets 58 may also be selectively adjusted by screwing in another of the previously disclosed annular inserts 120 into the outlet ring 60 in the manner heretofore described. Once this step is completed, all the separators 21 in the primary separator bank 11 will be fine tuned, and the steam generator 1 may be brought on line.

I claim:

1. An apparatus for drying a flow of steam having water droplets entrained therein, comprising:
    (a) an elongated housing having an inlet for receiving said flow of steam, and an outlet for expelling a flow of drier steam;
    (b) a set of pitched blades mounted in said housing for generating a radial component of motion in the steam flowing downstream of said blades so that a substantial portion of said water droplets assume a spiraling path that intersects with the interior of the housing;
    (c) an opening located in the interior of the housing at a selected axial position for capturing at least some of the water droplets spiraling toward the interior of the housing; and
    (d) adjustment means for adjusting the spiraling paths of the water droplets entrained in the steam flow to maximize the amount of said droplets captured by said opening, including means for varying the cross-sectional area of the housing outlet in order to vary the speed of the flow of steam through the housing, and means for varying the axial position of the pitched blades between the inlet and the outlet of the housing.

2. The apparatus of claim 1, wherein said adjustment means includes an insert which is detachably mountable to the outlet of the housing for varying the cross-sectional area of the housing outlet.

3. The apparatus of claim 1, wherein said housing outlet is round, and said adjustment means includes at least one insert that is detachably mountable around the circumference of the outlet in order to vary the cross-sectional area thereof.

4. The apparatus of claim 1, wherein said housing includes a riser barrel which is surrounded by a downcomer barrel, and wherein said downcomer barrel has a cap that includes the steam outlet of the housing.

5. The apparatus of claim 4, wherein one end of the riser barrel is spaced apart from the inside surface of the cap of the downcomer barrel in order to define said capturing opening within said housing.

6. The apparatus of claim 1, wherein said adjustment means further includes at least two clamping assemblies connected on opposite sides of the set of pitched blades for detachably clamping the blades at a selected point between the inlet and the outlet of the housing.

7. The apparatus of claim 6, wherein said housing includes a pair of opposed slots for receiving said clamping assemblies.

8. An improved swirl vane separator having a housing with an inlet for receiving a flow of steam having water droplets entrained therein, an outlet for expelling a flow of at least partially dried steam, a set of pitched blades mounted in the housing for generating a radial component of motion in the steam flowing downstream of the blades so that a substantial portion of the water droplets assume a spiraling path that intersects with the interior of the housing, and an opening located in the interior of the housing for capturing at least some of the spiraling water droplets, wherein the improvement comprises adjustment means for adjusting the spiraling path of the water droplets entrained in the steam so that a maximum amount are captured in said opening, including means for varying the crosssectional area of the housing outlet in order to vary the speed of the flow of steam through housing, and means for measuring the amount of water separation achieved by the separator, wherein said water measuring means is located in the vicinity of the housing outlet.

9. The separator of claim 8, wherein said adjustment means includes an insert which is detachably mountable to the outlet of the housing for varying the cross-sectional area of the housing outlet.

10. The separator of claim 8, wherein said adjustment means further includes a means for varying the position of the pitched blades between the inlet and the capturing opening of the housing.

11. The separator of claim 10 wherein said adjustment means includes at least two clamping assemblies on opposite sides of the set of pitched blades for detachably clamping the blades at a selected point between the inlet and the outlet of the housing.

12. The separator of claim 11, wherein said housing includes a pair of opposed slots for receiving said clamping assemblies.

13. The separator of claim 12, wherein each of said clamping assemblies includes a blade support member having a slot on one end for receiving one of the pitched blades, a clamping bolt at the other end whose shank extends through one of the pairs of opposed slots for clamping the blade support member to a selected point along one of the pairs of slots.

14. The separator of claim 13, wherein each of said pairs of slots includes first and second slots through the walls of the riser barrel and the downcomer barrel, respectively, in registry with one another, and wherein the blade support member extends through the slot in the riser barrel while the shank of the clamping bolt extends through the slot in the downcomer barrel so that the head of the clamping bolt frictionally engages the blade support member to the inner wall of the downcomer barrel when said clamping bolt is tightened.

15. The separator of claim 14, wherein each of the clamping assemblies further includes a locking cup for securing the head of the clamping bolt from spurious rotation after said bolt is tightened into a clamping position.

16. An improved swirl vane separator of the type having a housing with an inlet for receiving a flow of steam having water droplets entrained therein, an outlet for expelling a flow of drier steam, pitched blade means for imparting a radial component of motion in the steam flowing downstream of the blades so that a substantial portion of the water droplets assume a spiraling path that terminates against the interior of the housing, and an opening located in the interior of the housing downstream of the blade means for capturing a substantial amount of the spiraling water droplets, wherein the improvement comprises means for adjusting the spiraling path of the water droplets entrained in the steam so that a maximum amount of said droplets are captured by the opening, including means for varying the cross-sectional area of the housing outlet in combination with means for varying the position of the pitched blade means between the housing outlet and the housing inlet.

17. The separator of claim 16 wherein the housing outlet is round, and said means for varying the cross-sectional area thereof includes at least one annular insert which is detachably mountable around the circumference of the outlet.

18. The separator of claim 17, wherein the housing includes a riser barrel circumscribed by a downcomer barrel whose downstream end is covered by a cap that includes the housing outlet, the downstream edge of said riser barrel being spaced from said cap to define the opening in the interior of the housing that captures the spiraling water droplets, and wherein the space between the riser and downcomer barrel defines a downcomer path for the water droplets, and wherein both the riser and downcomer barrels include a pair of opposed slots in mutual registry with one another, and wherein the means for varying the position of the pitched blade means includes a pair of opposing clamping assemblies that are connected on opposite sides of the pitched blade means and that extend through the pair of opposed slots in both the riser and downcomer barrels.

19. The separator of claim 18, wherein each of the clamping assemblies includes a blade support member having a slot on one end for receiving one of the blades of the pitched blade means, a clamping bolt at the other end for frictionally engaging said end of the blade support member against the inner wall of the downcomer barrel, and a locking cup for securing the head of the clamping bolt from spurious rotation after said bolt is tightened to draw the blade support member into frictional contact with the inner wall of the downcomer barrel.

20. A method for maximizing the amount of water separation achieved by the plurality of swirl vane separators present on the secondary side of a steam generator, wherein each of the separators includes an elongated housing, an inlet at its lower end, an outlet on its upper end, an opening in the interior of its housing for capturing droplets of water which spiral toward the interior walls of the housing as a result of the radial component of motion in the steam flow, and means for measuring the amount of water separation achieved by the separator, wherein said water measuring means is located in the vicinity of said housing outlet, comprising the step of varying the cross-sectional area of the housing outlet of each of the separators until the amount of water droplets captured by the interior opening in each separator is maximized.

21. A method for maximizing the amount of water separation achieved by the plurality of swirl vane separators in the secondary side of a steam generator, wherein each of the separators includes an elongated housing, an inlet at its lower ends, an outlet on its upper end, a pitched blade means mounted between the inlet and outlet, an opening in the interior of its housing for capturing droplets of water which spiral toward the interior walls of the housing as a result of the radial component of motion in the steam flow imparted by the pitched blade means, and means for measuring the amount of water separating achieved by the separator, wherein said water measuring means is located in the vicinity of said housing outlet, comprising the step of varying the position of the pitched blade means of each of the separators along the longitudinal axis of its housing until the amount of water droplets is captured by the interior opening in each separator is maximized.

22. A method for maximizing the amount of water separation achieved by the plurality of swirl vane separators present in the secondary side of a steam generator, wherein each of the separators includes an elongated housing, an inlet at its lower end, an outlet of its upper end, a pitched blade means mounted between the inlet and the outlet, an opening in the interior of its housing for capturing droplets of water which spiral toward the interior walls of the housing as a result of the radial component of motion in the steam flow, and means for measuring the amount of water separation achieved by said separator, wherein said water measuring means is located in the vicinity of said housing outlet, comprising the steps of
(a) varying the cross-sectional area of the housing outlet of each of the separators until the amount of water droplets captured by the internal opening in each separator reached a first maximum, and then
(b) varying the position of each of the pitched blade means along the longitudinal axis of the housing until the amount of water droplets captured the internal opening in each separator reaches a second maximum.

23. The method of claim 22, further comprising the steps of repeating steps (a) and (b).

24. A method for maximizing the amount of water separation achieved by the plurality of swirl vane separators present in the secondary side of a steam generator, wherein each of the separators includes an elongated housing, and inlet at its lower end, an outlet on its upper end, a pitched blade means for imparting a radial component of motion in the flow of steam entering the inlet of the housing, an opening in the interior of its housing for capturing droplets of water which spiral toward the interior walls of the housing as a result of the radial component of motion in the steam flow, and means for measuring the amount of water separation achieved by the separators, wherein said water measuring means is located in the vicinity of said housing outlet, comprising the steps of
(a) providing opposing slots in the housing of each of the separators, each slot being aligned with the longitudinal axis of its respective separators;
(b) connecting opposing clamping assemblies on opposing sides of each of the pitched blade means of the separators, wherein each clamping assembly extends through one of the opposing slots in each separator housing;
(c) varying the longitudinal position of the pitched blade means of each separator until the amount of water droplets captured by the internal opening in the housing is maximized;

(d) securing the pitched blade means in the position located in step (c) by means of the clamping assemblies, and (e) covering each of the opposing slots in each of the housing of the separators.

25. The method of claim 24, further including the step of varying the cross-sectional area of the outlet of each of the separators until the amount of water droplets captured by the internal opening in the housing is further maximized.

26. The method of claim 25, wherein the varying of the cross-sectional area of each of the outlets of the separators is accomplished by detachably mounting an annular insert in each outlet.

* * * * *